Figure 1:
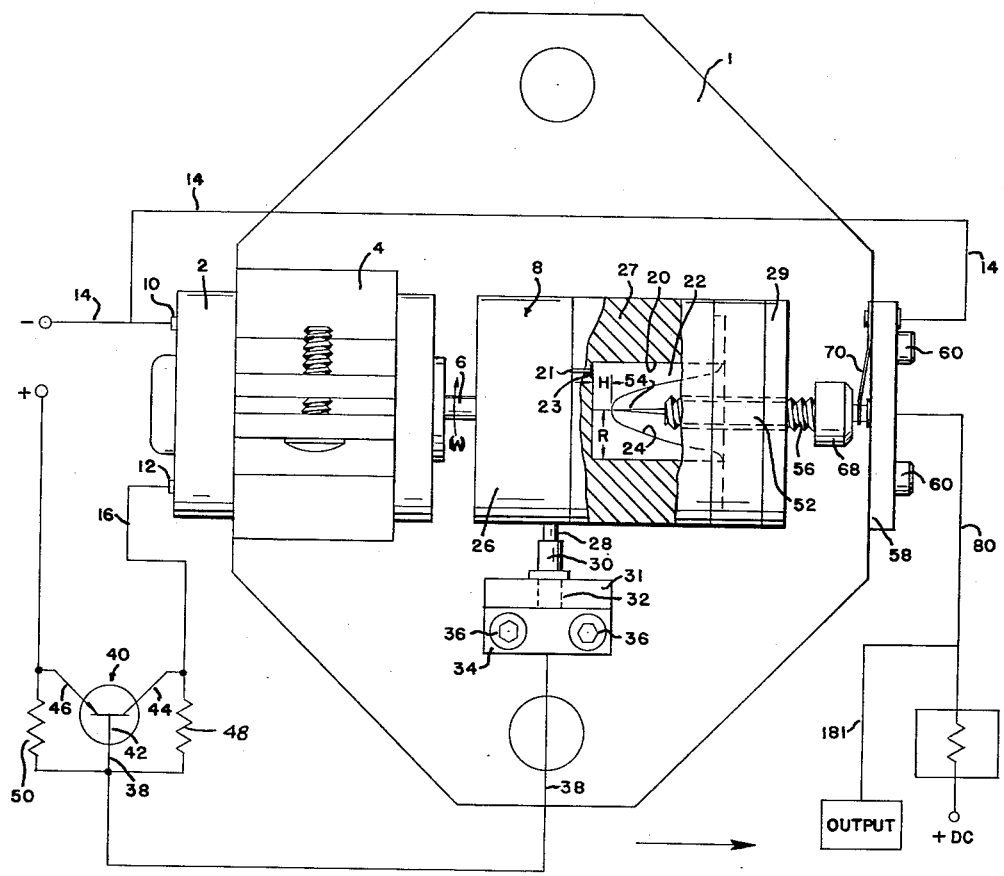

Aug. 7, 1962   K. E. POPE   3,048,042
ACCELEROMETER
Filed April 22, 1959   4 Sheets-Sheet 1

INVENTOR.
KENNETH E. POPE
BY *Milton E. Gilbert*
HIS ATTORNEY

INVENTOR.
KENNETH E. POPE
HIS ATTORNEY

Aug. 7, 1962   K. E. POPE   3,048,042
ACCELEROMETER

Filed April 22, 1959   4 Sheets-Sheet 4

INVENTOR.
KENNETH E. POPE
BY *Milton E. Gilbert*
HIS ATTORNEY

United States Patent Office 3,048,042
Patented Aug. 7, 1962

3,048,042
ACCELEROMETER
Kenneth E. Pope, Albuquerque, N. Mex., assignor to Globe Industries, Inc., Dayton, Ohio, a corporation of Ohio
Filed Apr. 22, 1959, Ser. No. 808,074
5 Claims. (Cl. 73—516)

This invention relates to an acceleration responsive device, and particularly to one of the type having an acceleration responsive element rotatably mounted therein.

One field of application of such acceleration sensing devices is in inertial guidance systems. In such a system the accelerometer is essentially the brain of the entire guidance system. The function of such a system is to provide knowledge as to the position of the vehicle with respect to a reference point. One type of accelerometer which has been suggested is the strain gauge or potentiometer type accelerometer. Such units are difficult to employ in inertial guidance systems since their output is proportional to acceleration directly. As a result, the output of such accelerometers must be integrated electronically if vehicle velocity or distance is to be obtained. Such devices present difficult problems regarding obtaining of proper linearities and sensitivities; and also the electronic integrater employed has been found to be stable only for short intervals of time and therefore must be highly compensated and environmentally controlled within close limits.

Thereafter, direct integrating acceleration sensing devices were developed. The first types of such devices were single integrating types which had a velocity output signal. As an example of such devices, the pendulous gyro is well-known. In this system, the precession rate is proportional to the acceleration applied along an axis normal to the spin axis of the pendulous gyro. The displacement of the precession axis is proportional to the first integral of acceleration; i.e., the velocity. Such a system is limited to taking the first integral of acceleration since a displacement cannot be integrated further by a mechanical means. Therefore, here again, an electronic system or integrater must be incorporated to determine the second integral of acceleration which, again, requires close environmental control.

As described in my application Ser. No. 469,567, filed November 17, 1954, now Patent No. 2,861,789, issued November 25, 1958, an integrating accelerometer has been developed which employs a modified D.C. motor and a single pole, single throw switch. The principle of operation is also based on the action of a pendulum, i.e., a torque on the pendulum is caused by the acceleration of the vehicle in which it is mounted, resulting in angular motion which is sensed; and by utilizing the reaction torque of the motor rotor, the pendulum is captured. In such a device the pendulum effect is obtained by attaching a mass to the stator of the motor, which is mounted on bearings. Thus, both the rotor and stator of the motor are free to rotate. When a force acts on a vehicle in which the device is mounted, the stator rotates due to the inertia of the unbalanced mass. This rotation closes a commutator type switch that connects power to the rotor of the permanent magnet D.C. motor. As power is applied, the torque of the motor accelerates the rotor with its flywheel load. The resulting reaction torque causes the stator to rotate in the opposite direction so as to counteract a rotation caused by the acceleration. This counter rotation opens the switch which interrupts the reaction torque, and allows a torque due to vehicle acceleration to rotate the stator back again. Hence, the motion of the stator is oscillatory and it is captured by the reaction torque of the rotor. The output of such a device is a square wave of the voltage applied to the output circuit. The reciprocal of the pulse width of the square wave is velocity; and the total number of pulses from zero time is the total distance traversed during the elapsed time.

Figure 2:
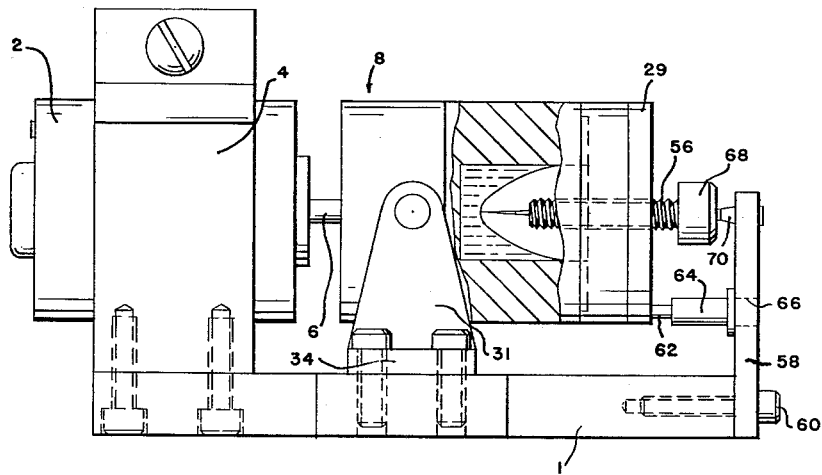
Figure 3:
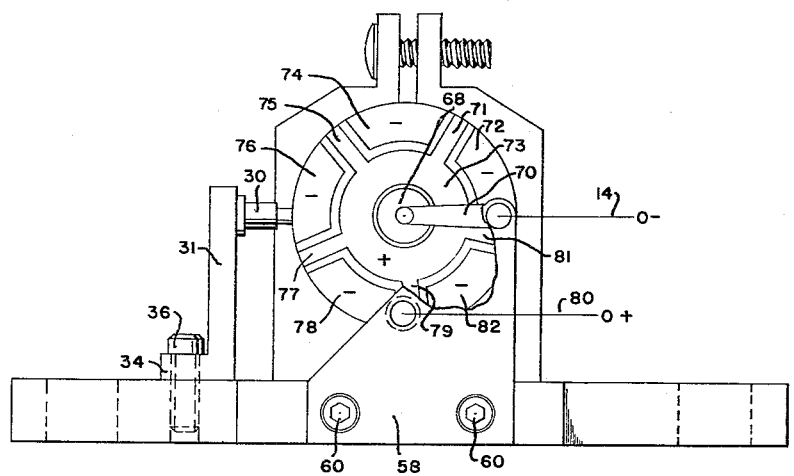
Figure 4:
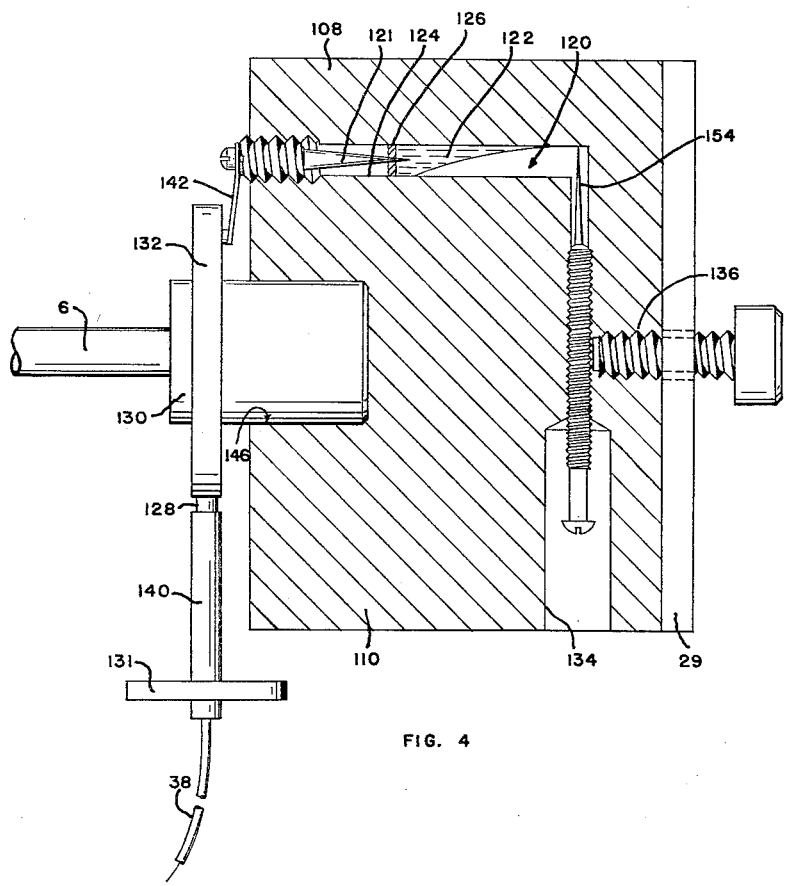

It is an object of this invention to provide a novel acceleration sensing device. It is a further object of the invention to provide a sensing device employing a novel principle of operation. A still further object of the invention is to provide an accelerometer which is a highly sensitive linear acceleration sensor and in which the sensing element has the absolute minimum of friction. These and further objects of the invention will become more readily apparent upon a reading of the specification following hereinafter, and upon an examination of the drawings, in which:

FIGURE 1 represents a top view of one embodiment of the invention, containing a schematic representation of the electrical circuit, FIGURE 2 represents a side view of the embodiment of FIGURE 1, FIGURE 3 represents an end view of the embodiment of FIGURE 1, and FIGURE 4 represents a cross-sectional view of a portion of the device of FIGURE 1, but indicating a preferred modification thereof.

The accelerometer of the invention employs as its basic operating principle the measuring of the speed of rotation of a forced vortex, wherein the speed is a function of a dimension, e.g., the height, of a forced vortex which can be described by the formula:

$$h = \frac{\omega^2}{2g} r^2$$

The control sensor of the device of the invention in its preferred embodiment is so arranged as to control the height of the vortex as a constant. Since the height ($h$) of the vortex at any given rotation ($\omega$) is proportional to the acceleration ($g$) acting upon the fluid, then by holding the height constant with varying acceleration, this results in a system whose rotational velocity $\omega$ is proportional to the square root of the acceleration acting upon the fluid. If a chopper output means is coupled to the forced vortex sensor, then output frequency is obtained which is proportional to the square root of $a$, and the total number of pulses generated is proportional to the square root of $v$ (velocity). If desired, by feeding this chopper output into a signal squaring circuit, frequency can be made to be proportional to $a$, directly; and the total number of pulses can be made to be proportional to $v$, directly.

Referring, now, to the drawings, and specifically to FIGURE 1, wherein the quantities $h$, $r$ and $\omega$ are referenced; it is known from the formulae for a forced vortex that $$h = \frac{\omega^2}{2a} r^2$$

Since $$h = \frac{P}{da}; \text{ or } \frac{\omega^2 r^2}{2a} = \frac{P}{da} = \frac{hda}{da}$$

then $$a = \frac{\omega^2 r^2}{2h}$$

where $P$ is the hydrodynamic pressure. Since $h$ and $r$ are known constants, then $a = C\omega^2$.

As shown in FIGURE 1, a motor 2 is mounted upon a base 1 and rigidly held in place by a bracket 4. The motor 2 is most advantageously a D.C. motor which can obtain its power supply through sources commonly available in airborne vehicles. The terminals 10 and 12 lead to brushes of the motor 2, in the event a permanent magnet D.C. motor is employed; or then can lead to the field coils of the motor 2, in the event a wound field D.C. motor is used. The output shaft 6 of the motor 2 has fixedly mounted thereon a sensor 8 which contains a cavity 20. Partially filling this cavity 20 is a fluid 22. This fluid 22 may be any conductive fluid such as mercury, or a conductive oil, etc. Preferably, the fluid would be one having low surface tension and one which does not ionize within the operating range of the instrument.

Upon rotation of the motor and motor output shaft 6, the sensor unit 8 will also rotate, thus, forcing the fluid 22 within the cavity 20 to assume the shape of a vortex 24. The distance "$h$" between the bottom of the cavity 20 and the lowest portion of the vortex 24 will then be determined by the speed of rotation $\omega$ of the motor 2. The sensor 8 consists of a cylindrical portion 26 of conductive material such as copper, a central cylindrical portion 27 of non-conductive material which contains the cavity 20; and an end portion 29 which contains portions of conductive and portions of non-conductive materials, as more fully described hereinafter (it may be a printed circuit board).

An electrically conductive brush 28 is mounted within a brush holder 30, carrying a pressure spring (not shown). This brush holder 30 is, in turn, mounted into a bracket 31 which is fastened onto the base plate 1 by fastening means 36, 36 extending through the lower flange 34 of bracket 31. The brush holder 30 is held within the cavity 32 of the bracket 31 and an appropriate conductor 38 is electrically placed in contact with the brush 28. The conductive disc 26 which is in electrical contact with the brush 28 is provided with a conductor button 21 which places the disc 26 in electrical contact with the fluid 22 by means of the head 23 on the button 21.

An electrode 52 containing a conductor probe 54 is mounted at the other end of the sensor 8, and can be positioned at any desirable distance from the bottom of the cavity 20 by means of the threaded portion 56. The probe 54 is positioned within the cavity 20 at such a location, that when the motor 22 is operating at its rated speed, the vortex 24 set up in the fluid 22 is such that the probe 54 is still in contact with the bottom of the vortex 24 so that a conductive path is maintained through the fluid 22. When the vehicle in which the device is mounted changes its rate of acceleration, the distance "$h$" will decrease, thus discontinuing or breaking the current path through the fluid. When this occurs, power to the motor is shut off, as explained hereinafter.

The nature of the end plate 29 is more clearly shown in FIGURES 2 and 3. End plate 29 may be formed by mounting a series of conductive inserts (e.g., preferably of copper) into the central body 27 which is preferably of a plastic material (or by making a disc by printed circuit technique). The end inserts, then, would be molded into this central body 27. These inserts consist of a series of segmental elements 72, 74, 76, 78 and 82, which are electrically insulated by the plastic material from a central segment 73 which has spoke-like extensions 71, 75, 77, 79 and 81. As indicated by the construction of FIGURE 3, upon rotation of the sensor 8, there will be transmitted through the output line 80, 81 a series of pulses, consisting of five pulses per revolution in the construction shown. It is to be understood, however, that the number of pulses per revolution can be made any desired amount, depending upon the application to which the device is to be put and the resolution desired. The device is sensitive to and measures accelerations in the direction shown by the arrow in FIG. 1 (i.e., along the axis of rotation toward the sensing probe). A positive potential is maintained through the lead 80 on the brush 62; whereas negative potential is maintained on the probe 54 by spring loaded brush contact 70.

The commutator circuit consists of the ground lead 14 which is connected to the reed or contact brush 70 which bears upon screw head 68 and through the threads 56 which shorts through the commutator sections 71, 75, 77, 79 and 81. The sections 72, 74, 76, 78 and 82 are of insulating material. A brush support block 58 is mounted on one end of the base plate 1, by the screws 60, 60. This block 58 carries the contact brush 70, and also is provided with an opening 66 (see FIGURE 2) in which is affixed the brush holder 64, carrying the brush contact 62. This brush contact 62 bears upon the outer area of the segmented commutator section on end plate 29. Thus, when the housing or sensor 8 is rotated an intermittent ground will be sensed or picked off by the brush 62. This brush 62 is supplied with an external plus power through line 80, as indicated above.

The sensor 8 just described can be made more sensitive by the arrangement disclosed in FIGURE 4. In this arrangement, instead of sensing the height to the free surface of the liquid from the bottom of the container; what is sensed is the upper portion of the parabolic free surface of the liquid. This portion of the liquid 122 will be more sensitive to the change of acceleration of the vehicle, since the upper part of the free surface of the liquid exhibits a greater motion upon changes in acceleration of the body. The liquid 122 is entrapped in a cavity 120 formed within the bore 124 by a washer or seal 126 mounted at the end of the probe electrode 121. The probe electrode 121 is adjustable within the bore 124 so as to control the location of the body of fluid 122 and the size of the chamber 120. The sensor 108 comprises a cylindrical block 110 of non-conductive material which is provided with the two intersecting bores 124 and 134 and the axial bores 136 and 146. Within the axial bore 146 is mounted a block of non-conductive material 130 which is affixed to the motor output shaft 6. Fixedly mounted upon this cylindrical block 130 is a disc 132 of conductive material. The mounting flange 131 in FIGURE 4 corresponds to the flange 31 in FIGURE 1, and the brush holder 140 in FIGURE 4 corresponds to the brush holder 30 in FIGURE 1. A brush 128 is mounted within this brush holder 140, which bears upon the peripheral surface of the disc 132. In contact with one surface of the disc is a wiper 142 which is fastened at its other end to the adjustable electrode 121. The current flow will therefore be from conductor 38 through brush 128, disc 132, spring brush contact 142, electrode 121, the fluid 122 to the second probe electrode 154. The probe electrode 154 is adjustably mounted within the cavity 134 and the block 108. The set screw 136 serves two functions; it locks the electrode 154 into its adjusted position and also serves as a means for conducting current away from this probe in a manner similar to that shown in FIGURES 1, 2 and 3. The non-conductive cylindrical block 110 has affixed at its other end, e.g., by a molding operation, a disc 29 similar to the disc 29 shown in FIGURES 1–3, which carries conductive segments similar to that shown in FIGURE 3. The remaining construction shown in FIGURES 1–3 has not been shown in FIGURE 4, since it is believed to be obvious that it would be identical, and all that is intended is the substitution of one sensor 108 for another sensor 8.

In operation, the base 42 of the transistor 40 is biased negative intermittently by the current path from the negative terminal through conductor 14, spring contact 70, probe electrode 56, the conductive liquid 22, the conductor 21, conductive disc 26, brush 28 and conductor 38. The resistances 48 and 50 are current limiting resistors for the collector and emitter, respectively. With the base 42 of the transistor biased negative, current will flow through the transistor 40 from emitter 46 to collector 44 through conductor 16 to the motor terminal 12. The motor will then rotate and the sensor 8 mounted on the output shaft 6 of the motor will also rotate. The liquid 22 within the cavity or container 20 will then rotate about the axis of the motor shaft 6. Relative equilibrium is reached a short time after the commencement of the rotation, and the liquid will then rotate as a solid body. As is well-known in fluid dynamics, such a motion is called a forced vortex, with the free surface of the liquid being curved into the form of a parabolic surface of revolution. As the rotational velocity of the vortex becomes sufficient to raise the fluid to height "$h$" in the acceleration field, any acceleration applied to the vehicle in the direction of the arrow in FIGURE 1 will cause the probe electrode 54 to lose contact with the free surface of the liquid 22 thus removing the bias on the transistor 40 and causing it to become non-conductive and disrupt the flow of current to the motor. The motor will then slow down, with the result that the fluid 22 will slow down and begin to settle within the container and, again, make contact with the probe 54, thus biasing the transistor and turning power on to the motor. This type of on-off power action will continue at a high rate so that what is obtained is a dithering action of the motor. The rotational speed must therefore increase or decrease proportional to the square root of the acceleration if the formulas given above are referred to. The output signal obtained from the accelerometer will be a series of pulses, and in the embodiment shown in FIGURE 3, it will be five pulses per revolution. The number of pulses are determined by the number of segments 71, 75, etc. These pulses will be varying in frequency in accordance with the changes in speed of rotation of the mass of the forced vortex or of the sensor 8. As indicated above, the total number of pulses over a given period of time will be proportional to the velocity attained by the carrying vehicle and the frequency of these pulses will be proportional to the acceleration acting upon the carrying vehicle.

There is thus obtained an accelerometer operating or employing a forced vortex of a fluid, which has a digital pulse output which is simple to telemeter and readily employable in digital computer circuits. The sensor of the invention has a low friction due to employing fluid as the only sensory moving part, which is restrained from motion by the nature of a forced vortex, i.e. the fluid moves as a body and no particles of the fluid slide over one another. The employment of a fluid body in a forced vortex is independent of the viscosity and density of the fluid since the driving and restraining forces on the fluid body are not dependent on these parameters. The sensor of the invention, has only one sensitive axis and therefore exhibits a very low cross coupling or "cross-talk" to accelerations along other axes. The accelerometer of the invention also is capable of very high output signal voltages with only low operating voltage on a miniature size D.C. motor. Since it is desirable in a vehicle to measure both acceleration and deceleration, a pair of the devices may be arranged in back-to-back relationship, with the outputs fed into an appropriate summing network. Also, several of the devices of the invention can be arranged along different axes to measure acceleration along such axes.

Although what has been described hereinabove are preferred embodiments of the invention, it is to be understood that various modifications and alterations in the device of the invention can be made, while still coming within the scope of the invention as set forth in the appended claims.

What I claim is:

1. A digitally operating acceleration responsive device comprising a rotatably mounted acceleration sensor housing; motor means interconnected to rotate said housing; said housing being provided with a chamber; an electrically conductive fluid within said chamber and adapted to be forced into a vortex upon rotation of said housing; said fluid vortex evidencing dimensional changes upon the device being subjected to acceleration forces; a motor power switching means; triggering means including said fluid vortex and a portion of said housing responsive to dimensional changes of said vortex to intermittently activate said power switching means to dither said motor and vortex and tending to maintain said vortex constant; and an electrical pulse generator means mounted on said housing and adapted to generate a train of pulses constituting a digital representation of the acceleration acting upon said vortex.

2. The device of claim 1 wherein said triggering means comprises fluid position sensing probe contacts so arranged with respect to said fluid as to make and break an electrical circuit in response to dimensional changes of said fluid and thereby serve to intermittently activate said power switching means.

3. The device of claim 2 wherein at least one probe contact is arranged to contact the conductive fluid at a point along its free surface and at least one other contact being in electrical conducting relationship with the body of said fluid vortex, whereby when said device is subjected to acceleration forces said free surface will change dimension and remove said fluid from electrical contact with said first mentioned probe contact.

4. The device of claim 3 wherein said pulse generator means includes a commutating device formed by a commutating surface on said housing to which said first mentioned probe is connected, and pick-off means cooperating with said commutating surface to pick-off and transmit said pulsed signals, whereby the total number of pulses is proportional to the velocity attained per unit time and the frequency thereof is proportional to the acceleration of the device.

5. The device of claim 1 wherein said power switching means includes a transistor having its base electrode biased by said triggering means and its collector-emitter path in series with a power supply to said motor means.

References Cited in the file of this patent

UNITED STATES PATENTS

| | | |
|---|---|---|
| Re. 8,102 | Weston | Feb. 26, 1878 |
| 2,164,991 | Ingres | July 4, 1939 |
| 2,205,375 | Dyer | June 18, 1940 |
| 2,265,023 | Bergvall | Dec. 2, 1941 |
| 2,319,940 | Marrison | May 25, 1943 |
| 2,386,777 | Bentley | Oct. 16, 1945 |
| 2,662,956 | Bareford | Dec. 15, 1953 |
| 2,697,594 | Stanton | Dec. 21, 1954 |
| 2,819,052 | Dudenhausen | Jan. 7, 1958 |
| 2,846,207 | Marggraf | Aug. 5, 1958 |